(12) United States Patent
Pavithran et al.

(10) Patent No.: US 8,797,453 B2
(45) Date of Patent: Aug. 5, 2014

(54) AUTOFOCUS-ZOOM CAMERA MODULE INTEGRATING LIQUID CRYSTAL DEVICE AS HIGH SPEED SHUTTER

(75) Inventors: Prebesh Pavithran, Bukit Mertajam (MY); Yeow Thiam Ooi, Butterworth (MY); Haw Chyn Cheng, Butterworth (MY); Hung Khin Wong, Wing Onn Garden (MY); Khen Ming Goh, Mullara Damansara (MY)

(73) Assignee: Digitaloptics Corporation, San Jose, CA (US)

( * ) Notice: Subject to any disclaimer, the term of this patent is extended or adjusted under 35 U.S.C. 154(b) by 211 days.

(21) Appl. No.: 13/404,528

(22) Filed: Feb. 24, 2012

(65) Prior Publication Data
US 2012/0218450 A1 Aug. 30, 2012

Related U.S. Application Data

(60) Provisional application No. 61/446,151, filed on Feb. 24, 2011.

(51) Int. Cl.
*H04N 5/225* (2006.01)
*H04N 5/238* (2006.01)

(52) U.S. Cl.
CPC .................................. *H04N 5/2254* (2013.01)
USPC ............................ 348/374; 348/335; 348/367

(58) Field of Classification Search
CPC ... H04N 5/222; H04N 5/2251; H04N 5/2252; H04N 5/2253; H04N 5/2254; H04N 5/2257
USPC .................. 348/340, 360, 361, 363, 367, 374
See application file for complete search history.

(56) References Cited

U.S. PATENT DOCUMENTS

| 6,534,796 | B1 * | 3/2003 | Bishay et al. | 257/80 |
| 7,450,187 | B2 * | 11/2008 | Sun | 349/2 |
| 7,639,294 | B2 * | 12/2009 | Ito | 348/296 |
| 7,869,149 | B2 * | 1/2011 | Ke | 359/824 |

(Continued)

FOREIGN PATENT DOCUMENTS

| CN | 100592143 | C | * | 2/2010 |
| CN | 102375199 | A | * | 3/2013 |

(Continued)

OTHER PUBLICATIONS

PCT Application No. PCT/US2012/026567 International Search Report and Written Opinion dated Sep. 5, 2012.

(Continued)

*Primary Examiner* — John Villecco
(74) *Attorney, Agent, or Firm* — Larry E. Henneman, Jr.; Gregory P. Gibson; Henneman & Associates, PLC

(57) ABSTRACT

A camera module having a liquid crystal shutter that controls the time period during which the image sensor is exposed to light directed into the camera module. The shutter is located within the camera module housing, which may include EMI shielding and may include a lens actuator for moving a movable lens group. The shutter may be located before or after the movable lens group and before or after a fixed lens group that may also be included. The camera module may also include an IR filter for reducing the amount of IR light that reaches the image sensor.

10 Claims, 6 Drawing Sheets

(56) References Cited

U.S. PATENT DOCUMENTS

| | | | |
|---|---|---|---|
| 8,107,006 B2 * | 1/2012 | Sekimoto et al. | 348/374 |
| 2004/0212724 A1 * | 10/2004 | Bawolek et al. | 348/363 |
| 2004/0223075 A1 * | 11/2004 | Furlan et al. | 348/363 |
| 2008/0085113 A1 * | 4/2008 | Hsiao | 396/457 |
| 2008/0101791 A1 * | 5/2008 | Hsiao | 396/457 |
| 2008/0124072 A1 * | 5/2008 | Yuan | 396/457 |
| 2009/0166511 A1 * | 7/2009 | Kwon et al. | 250/206 |
| 2010/0021156 A1 * | 1/2010 | Lin | 396/457 |
| 2011/0019993 A1 * | 1/2011 | Chou et al. | 396/505 |
| 2011/0080515 A1 * | 4/2011 | Kang | 348/374 |
| 2011/0134303 A1 * | 6/2011 | Jung et al. | 348/340 |
| 2012/0092543 A1 * | 4/2012 | Afshari et al. | 348/335 |
| 2012/0140101 A1 * | 6/2012 | Afshari et al. | 348/308 |
| 2013/0057757 A1 * | 3/2013 | Ryou | 348/374 |

FOREIGN PATENT DOCUMENTS

| | | | |
|---|---|---|---|
| CN | 202889427 U | * | 4/2013 |
| JP | 2007208587 A | * | 8/2007 |
| KR | 10 2009 0096953 A | | 9/2009 |
| KR | 10 2009 0125413 A | | 12/2009 |
| KR | 10 2010 0126176 A | | 12/2010 |
| KR | 10 2010 0138269 A | | 12/2010 |

OTHER PUBLICATIONS

PCT Application No. PCT/US2012/026567 International Preliminary Report on Patentability dated Sep. 6, 2013.

* cited by examiner

AUTOFOCUS-ZOOM CAMERA MODULE INTEGRATING LIQUID CRYSTAL DEVICE AS HIGH SPEED SHUTTER

CROSS REFERENCE

This application is the nonprovisional of U.S. Provisional Pat. Appl. No. 61/446,151, filed Feb. 24, 2011, entitled "AUTOFOCUS-ZOOM CAMERA MODULE INTEGRATING LIQUID CRYSTAL DEVICE AS HIGH SPEED SHUTTER," which is hereby incorporated by reference into this application.

BACKGROUND

Digital camera modules are currently being incorporated into a variety of host devices such as, for example, cellular telephones, personal data assistants (PDAs), computers, etc. Such host devices are becoming increasingly more compact and, therefore, permitting less and less space for camera module form factors. Accordingly, host device manufacturers prefer digital camera modules to be small, so that they can be incorporated into the host device without increasing the overall size of the host device. Of course, host device manufacturers also prefer camera modules that capture images of the highest possible quality. Therefore, the goal in designing and manufacturing camera modules is to minimize size, maximize performance (i.e. image quality, and simplify the overall manufacturing process.

It is against this background that the camera module disclosed herein has been developed.

SUMMARY

The disclosed camera module overcomes the issues associated with the prior art by providing a liquid crystal shutter. A camera module that is attached to and is a component in a mobile electronic device includes: an image sensor; a housing having an internal cavity within which the image sensor is located, the housing further having an opening at one end thereof to allow ambient light to pass into the housing; and a liquid crystal shutter positioned in the housing between the opening and the image sensor, to selectively either allow light to pass therethrough or block light from passing therethrough.

The camera module may further include a lens positioned in the housing between the opening and the image sensor. The lens may include a fixed lens group. The lens may further include a movable lens group and the camera module may further include an actuator to selectively move the movable lens group. The shutter may be positioned between the fixed lens group and the movable lens group. The shutter may be positioned between the opening and the movable lens group. The shutter may be positioned between the movable lens group and the image sensor. The shutter may be attached directly to the image sensor. The attachment may be made via glass-on-die (GOD) technology. The actuator may be formed as a housing located inside of the first housing.

The camera module may further include a circuit substrate to which the housing is attached, the substrate having a top side to which the image sensor is attached and a bottom side on which a plurality of electrical contact pads are provided for electrical connection of the image sensor and the shutter to circuitry external to the camera module. The housing may include a shield for reducing electromagnetic interference in the interior of the cavity from electromagnetic signals outside of the housing.

A camera module that is attached to and is a component in a mobile electronic device, including: an image sensor; a housing having an internal cavity within which the image sensor is located, the housing further having an opening at one end thereof to allow ambient light to pass into the housing; a lens positioned in the housing between the opening and the image sensor, wherein the lens further includes a movable lens group; an actuator to selectively move the movable lens group; and a liquid crystal shutter positioned in the housing between the opening and the image sensor, to selectively either allow light to pass therethrough or block light from passing therethrough.

The lens may further include a fixed lens group. The shutter may be positioned between the fixed lens group and the movable lens group. The shutter may be positioned between the opening and the movable lens group. The shutter may be positioned between the movable lens group and the image sensor. The shutter may be attached directly to the image sensor. The attachment may be made via glass-on-die (GOD) technology. The actuator may be formed as a housing located inside of the first housing. The camera module may further include a circuit substrate to which the housing is attached, the substrate having a top side to which the image sensor is attached and a bottom side on which a plurality of electrical contact pads are provided for electrical connection of the image sensor and the shutter to circuitry external to the camera module. The housing may include a shield for reducing electromagnetic interference in the interior of the cavity from electromagnetic signals outside of the housing.

DETAILED DESCRIPTION

Figure 1:
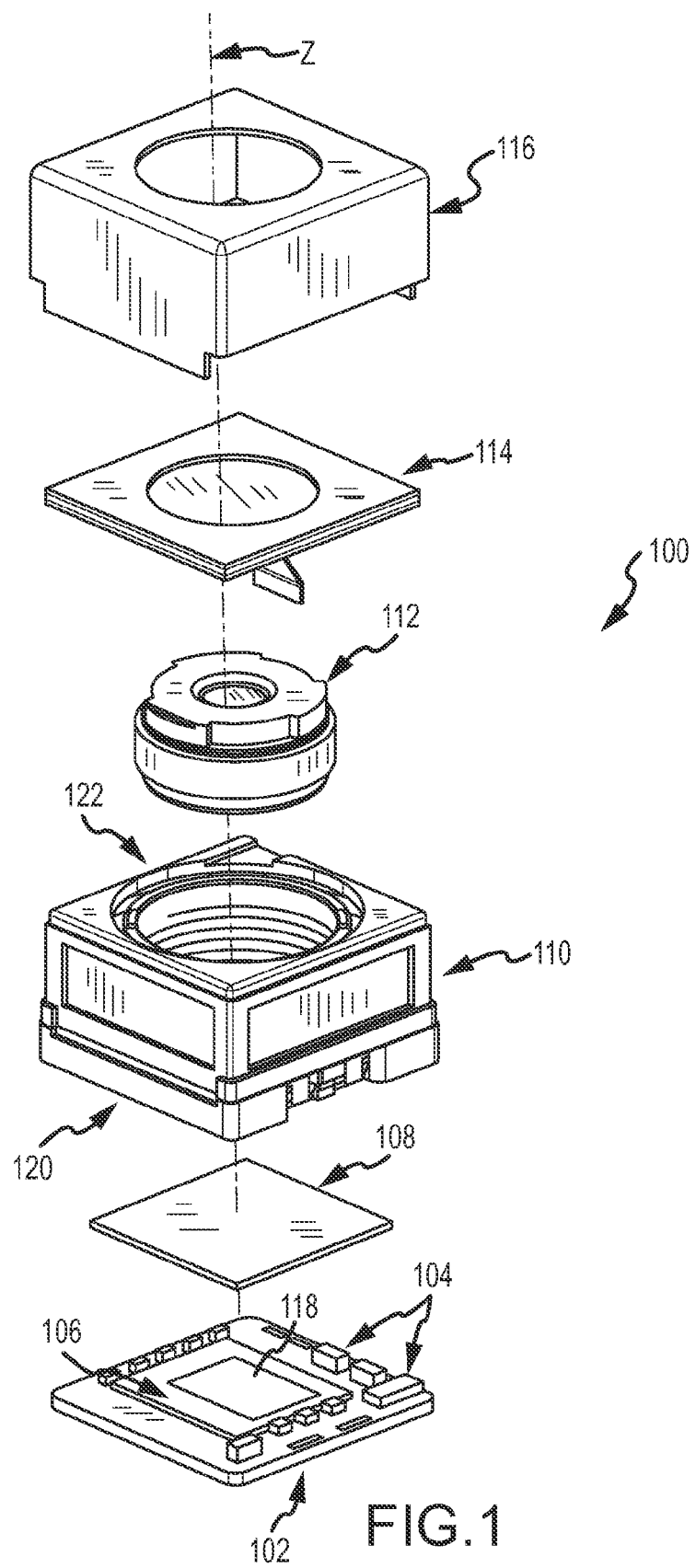
FIG. 1 is a exploded perspective view of a camera module.

While the embodiments of the present invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The present invention is described with reference to the drawings, wherein like reference numbers denote substantially similar elements:

FIG. 1 shows a perspective view of a camera module 100 according to one embodiment of the present invention. The camera module 100 includes a circuit substrate 102, a plurality of electrical components 104, an image sensor 106, an infrared (IR) filter 108, an actuator system 110, a lens system 112, a liquid crystal shutter device 114, and an actuator housing which acts as an electromagnetic interference shield 116. As shown, the camera module 100 is exploded along a Z-axis that is coaxially aligned with the optical center of the lens system 112 and perpendicularly centered with respect to a planar image sensor surface 118 of the image sensor 106.

The circuit substrate 102 includes electrical circuitry that facilitates electrical communication between the camera module 100 and a hosting device such as a mobile electronic device (e.g., a mobile phone).

Electrical components 104 (e.g., resistors, capacitors, IC chips, electrical connectors, terminals, processors, memory storage device, etc.) are mounted on the top surface of the circuit substrate 102 and electrically connected to the circuitry formed thereon. More specifically, the electrical components 104 are mounted on the circuit substrate via surface mount technology (SMT).

The image sensor 106 is also mounted on the top surface of the circuit substrate 102 and electrically connected to the circuitry formed thereon. The image sensor surface 118 of the image sensor 106 is operative to convert light, focused thereon via the lens system 112, into image data.

The IR filter 108 is mounted in the actuator system 110 so as to filter infrared radiation out of the light focused onto the image sensor surface 118 by the lens system 112. The IR filter 108 also prevents debris from accumulating on the image sensor surface 118. Alternatively, an IR filter could be incorporated into the lens system 112 and the IR filter 108 could be substituted by a non-filtering substrate that protects the image sensor surface 118 from debris.

The actuator system 110 is, for example, an autofocus/zoom actuator system that includes a bottom portion 120 and an opposite top portion 122. The bottom portion 120 is adapted to receive the IR filter 108 and is mounted on the top surface of the circuit substrate 102, over the electrical components 104 and the image sensor 106. The top portion 122 is adapted to receive the lens system 112. In this particular embodiment, the actuator system 110 includes a voice coil motor (VCM) for driving the lens system 112 along the Z-axis during autofocus/zoom operations.

The lens system 112 is a VCM driven lens barrel that houses a lens assembly (not visible) and is movably coupled to the top portion 122 of the actuator system 110. Further, the lens system 112 is responsible to move along the Z-axis when actuated by the actuator system 104 during autofocus/zoom operations.

The liquid crystal shutter device 114 is optically aligned with, and positioned between, the lens system 112 and the electromagnetic interference shield 116. The liquid crystal shutter device 114 is operative to control the passage of light into the camera module 100 via liquid crystal display technology wherein the amount of light that passes through the liquid crystal shutter device 114 is voltage dependent. The amount of light passing through a liquid crystal panel can be controlled with extremely high precision and speed. Accordingly, the passage of light through the liquid crystal shutter device 114 and, therefore, into the camera module 100 can be controlled with extremely high precision and speed. Indeed, the liquid crystal shutter device 114 contributes significantly to the overall performance of the camera module 100. For example, the liquid crystal shutter device 114 can change from opaque to transparent (one half cycle) at frequencies greater and 200 Hz such that extremely high shutter speeds can be achieved. Not only can the liquid crystal shutter device 114 achieve high shutter speeds, but also very low shutter speeds and any intermediate speeds therebetween. As another example, the exposure time can be controlled with extremely high precision such that the image quality of the camera module 100 can be maximized by exposing the image sensor 106 to the correct amount of light for given lighting conditions.

In addition to excellent performance, the liquid crystal shutter device 114 is extremely reliable, thin, and energy efficient. For example, the liquid crystal shutter device 114 is non-mechanical and, therefore, has a useful operating life that is not limited by the number of operating cycles. In other words, it does not wear out and, therefore, has a higher reliability than mechanical shutter devices, which often fail after less than 100,000 cycles. As another example, the liquid crystal shutter device 114 is thinner than 0.5 mm and, therefore, has minimal affect on the overall Z-height of the camera module 100. As another example, the liquid crystal shutter device 114 operates on very little low driver current (e.g., 15-30 mA) and, therefore, consumes only a small amount of host device power. The liquid crystal shutter device 114 will typically be one without a polarizer. It may have light transmission in the open state of approximately 95% or greater.

The EMI shield 116 is mounted over the actuator system 110, the lens system 112, and the liquid crystal shutter device 114. The EMI shield 116 may include a solid enclosure (or a cage) made of electrically conductive or magnetic materials. It serves to greatly reduce the amount of electromagnetic (particularly RF) energy that passes from outside the shield 116 to the interior of the camera module 100. It could also include a plastic housing coated with a metallic substance, such as a metallic ink. Other possible functions of the EMI shield 116 may be to prevent or reduce light leakage into the camera module 100 and to prevent or reduce the intrusion of foreign contaminants into the camera module 100.

Figure 2:
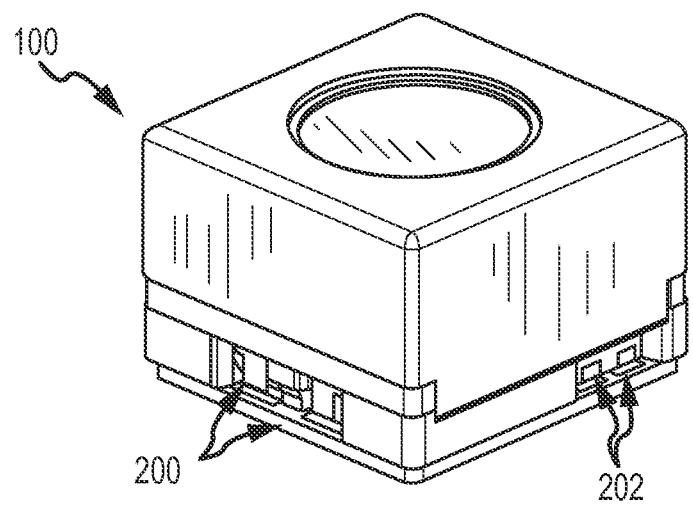
FIG. 2 is a top perspective view of the camera module of FIG. 1.

FIG. 2 shows a top perspective view of the camera module 100 assembly. As shown, the camera module 100 includes a set of voice coil motor terminals 200 and a set of liquid crystal shutter device terminals 202.

Figure 3:
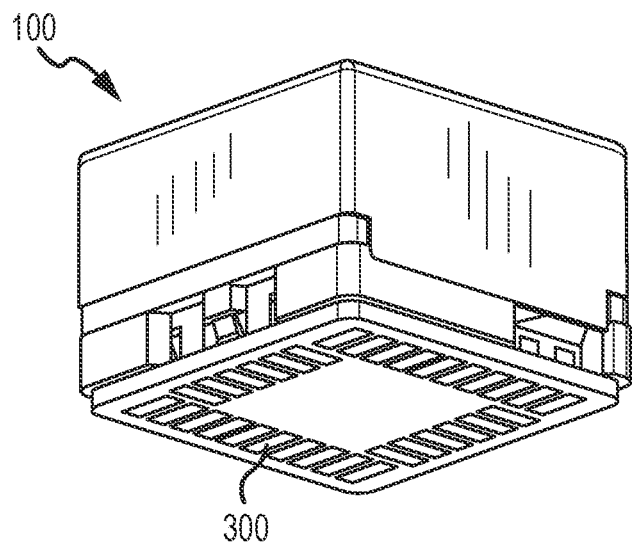
FIG. 3 is a bottom perspective view of the camera module of FIG. 1.

FIG. 3 shows a bottom perspective view of the camera module 100 assembled. As shown, the circuit substrate 102 includes a bottom surface wherein a set of electrical contact pads 300 is formed. Electrical contact pads 300 provide a means for electrically connecting the camera module 100 to host device circuitry.

Figure 4:
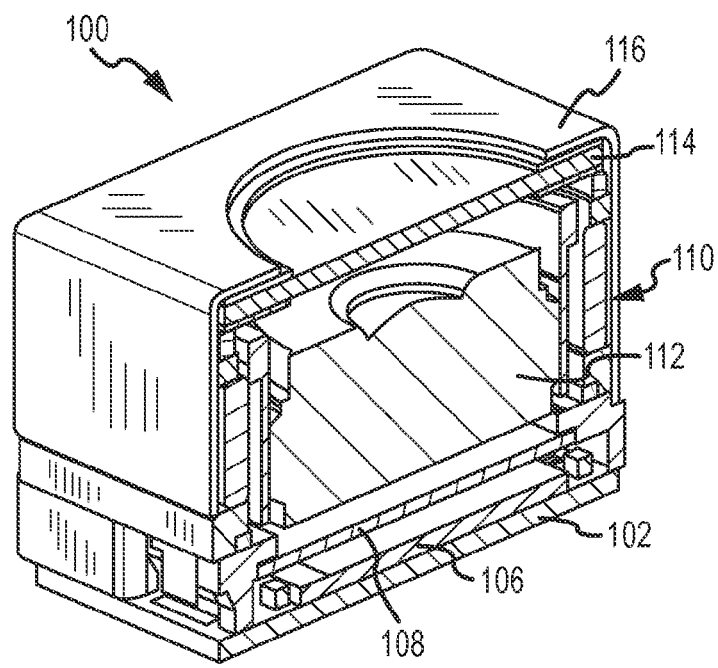
FIG. 4 is a cross-sectional view of the camera module of FIG. 1

FIG. 4 shows a cross-sectional view of the camera module 100 assembly.

Figure 5:
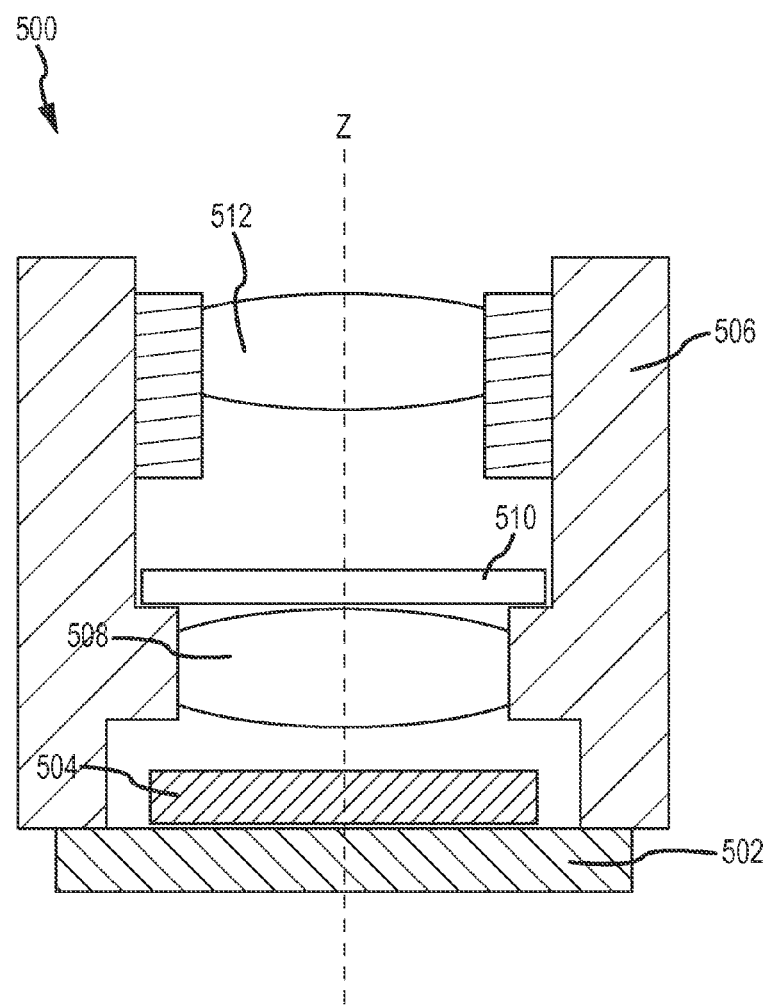
FIG. 5 is a schematic view of an alternative embodiment of a camera module.

FIG. 5 illustrates a camera module 500 accordingly to an alternative embodiment. The camera module 500 includes a circuit substrate 502, an image sensor 504, an actuator system 506, a fixed lens group 508, a liquid crystal shutter device 510, and a movable lens group 512. The image sensor 504 is fixably mounted on the circuit substrate 502, the actuator system 506 is fixably mounted on the circuit substrate 502, the fixed lens group 508 is fixably mounted in the actuator system 506, the liquid crystal shutter device 510 is fixably mounted in the actuator system 510 between the fixed lens group 508 and the movable lens group 512, and the movable lens group 512 is movably coupled to the actuator system 506 so as to facilitate autofocus/zoom operations by moving along the Z-axis when actuated by the actuator system 506.

Figure 6:
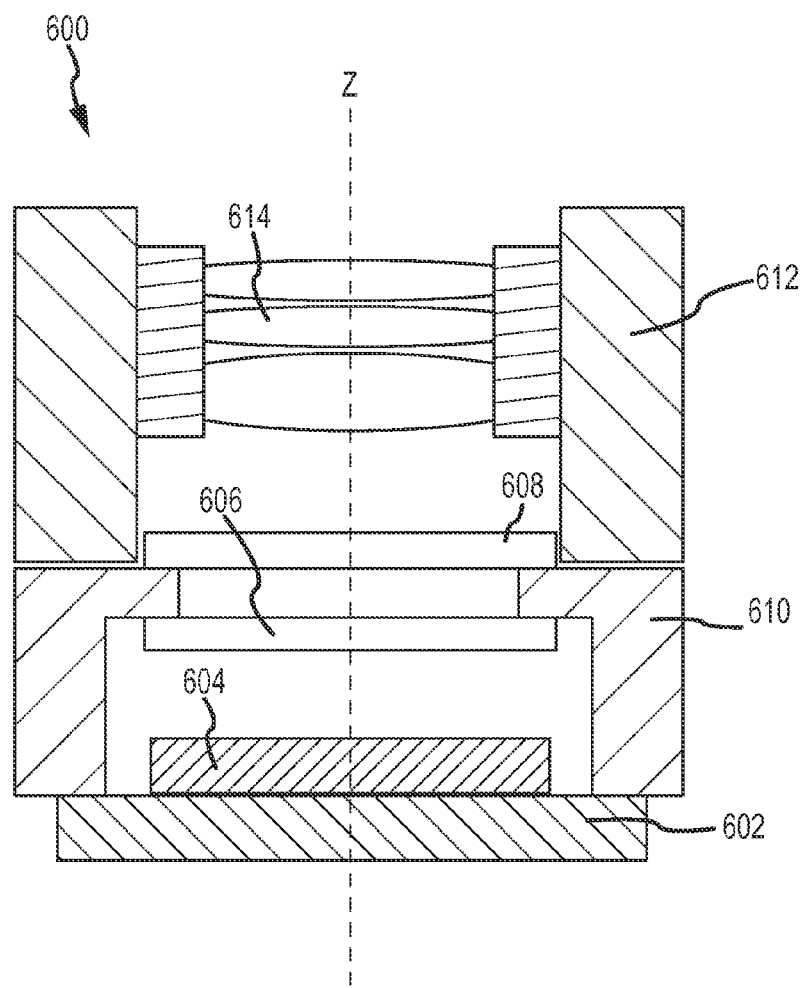
FIG. 6 is a schematic view of a second alternative embodiment of a camera module.

FIG. 6 illustrates a camera module 600 accordingly to another alternative embodiment. The camera module 600 includes a circuit substrate 602, an image sensor 604, a liquid crystal shutter device 606, an IR filter 608, a holder/frame 610 an actuator system 612, and a movable lens group 614. The image sensor 604 is fixably mounted on the circuit substrate 602, the liquid crystal shutter device 606 and the IR filter 608 are fixably mounted on opposite sides of the holder/frame 610, the holder/frame 610 is fixably mounted on the circuit substrate 602, the actuator system 612 is fixably mounted on the holder/frame 610, and the movable lens group 614 is movably coupled to the actuator system 612 so as to facilitate autofocus/zoom operations by moving along the Z-axis when actuated by the actuator system 612.

Figure 7:
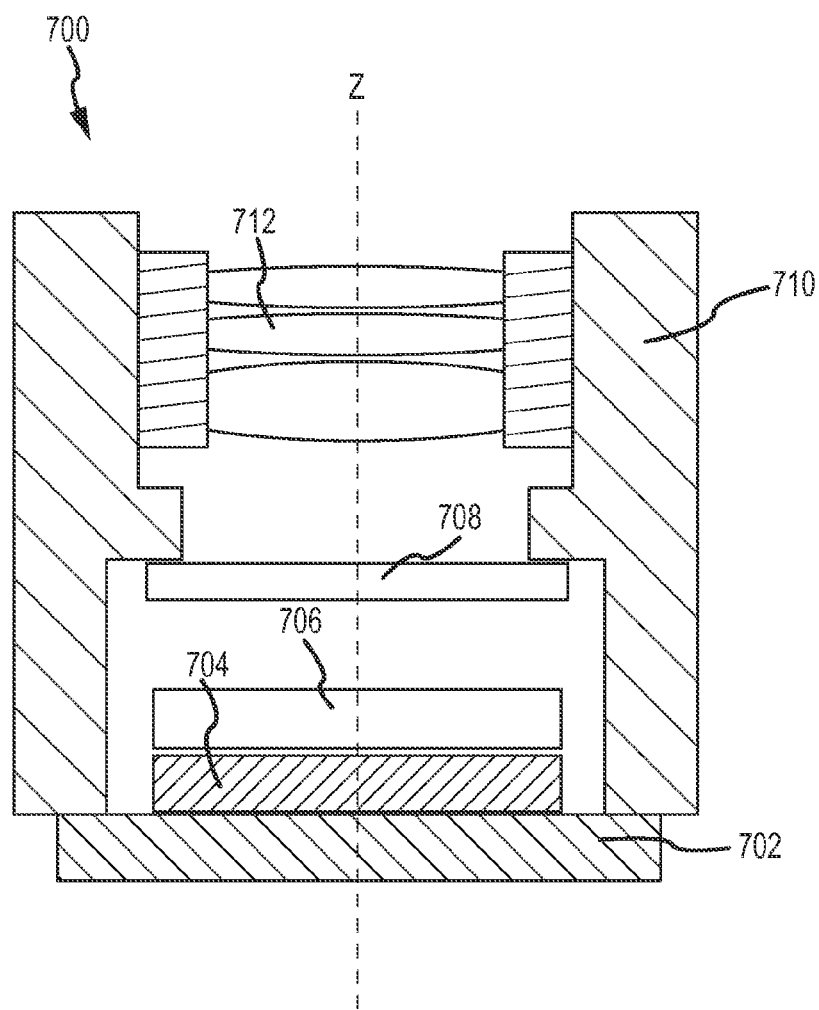
FIG. 7 is a schematic view of a third alternative embodiment of a camera module.

FIG. 7 illustrates a camera module 700 accordingly to yet another alternative embodiment. The camera module 700 includes a circuit substrate 702, an image sensor 704, a liquid crystal shutter device 706, an IR filter 708, an actuator system 710, and a movable lens group 712. The image sensor 704 is fixably mounted on the circuit substrate 702, the liquid crystal shutter device 706 is mounted on and/or integrated with the image sensor 704 via glass-on-die (GOD) technology, the IR filter 708 is fixably mounted to the actuator system 710, the actuator system 710 is fixably mounted to the circuit substrate 702, and the movable lens group 712 is movably coupled to the actuator system 710 so as to facilitate autofocus/zoom operations by moving along the Z-axis when actuated by the actuator system 710.

As can be seen, in particular embodiments of the present invention, a camera module includes a circuit substrate, an image sensor, an actuator system, a movable lens system, and a liquid crystal shutter device.

In one particular embodiment, the image sensor is mounted on the circuit substrate, the actuator is mounted on the circuit substrate so as to cover the image sensor, the movable lens system is coupled to the actuator system, and the liquid crystal shutter device is disposed over the movable lens system such that the lens system is located between the liquid crystal shutter device and the image sensor.

In an alternative embodiment, the camera module further includes a fixed lens group fixably mounted in the actuator system. Further, the image sensor is mounted on the circuit substrate, the actuator system is mounted on the circuit substrate such that the image sensor is positioned between the circuit substrate and the fixed lens group, the liquid crystal shutter device is positioned in the actuator system such that the fixed lens group is positioned between the image sensor and the liquid crystal shutter device, and the movable lens system is coupled to the actuator system such that the liquid crystal shutter device is positioned between the fixed lens group and the movable lens system.

In another alternative embodiment, the camera module further includes an IR filter fixably mounted within the top portion of the actuator system. Further, the image sensor is mounted on the circuit substrate, the liquid crystal shutter device is mounted to the bottom portion of the actuator system, the bottom portion of the actuator system is mounted on the circuit substrate such that the liquid crystal shutter device is positioned above the image sensor, and the movable lens system is coupled to the top portion of the actuator system such that the IR filter is positioned between the movable lens system and the liquid crystal shutter device.

In another alternative embodiment, the camera module further includes an IR filter fixably mounted within the bottom portion nof the actuator system. Further, the image sensor is mounted on the circuit substrate, the liquid crystal shutter device is mounted over the image sensor, the actuator system is mounted on the circuit substrate such that the image sensor and the liquid crystal shutter device are positioned between the IR filter and the circuit substrate, and the movable lens system is coupled to the top portion of the actuator system such that the IR filter is positioned between the movable lens system and liquid crystal shutter device.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A camera module that is attached to and is a component in a mobile electronic device, the camera module comprising:
   an image sensor;
   a housing having an internal cavity within which the image sensor is located, the housing further having an opening at one end thereof to allow ambient light to pass into the housing;
   a liquid crystal shutter positioned in the housing between the opening and the image sensor, to selectively either allow light to pass therethrough or block light from passing therethrough;
   a lens positioned in the housing between the opening and the image sensor, the lens including a fixed lens group and a movable lens group; and
   an actuator to selectively move the movable lens group; and wherein
   the shutter is positioned between the fixed lens group and the movable lens group.

2. A camera module as defined in claim 1, wherein the shutter is positioned between the movable lens group and the image sensor.

3. A camera module as defined in claim 1, wherein the actuator is formed as a second housing located inside of the housing.

4. A camera module as defined in claim 1, further including a circuit substrate to which the housing is attached, the substrate having a top side to which the image sensor is attached and a bottom side on which a plurality of electrical contact pads are provided for electrical connection of the image sensor and the shutter to circuitry external to the camera module.

5. A camera module as defined in claim 1, wherein the housing includes a shield for reducing electromagnetic interference in the interior of the cavity from electromagnetic signals outside of the housing.

6. A camera module that is attached to and is a component in a mobile electronic device, the camera module comprising:
   an image sensor;
   a housing having an internal cavity within which the image sensor is located, the housing further having an opening at one end thereof to allow ambient light to pass into the housing;
   an outer housing surrounding the housing and being positioned such that an opening of the outer housing is above the opening of the housing;
   a lens positioned in the housing between the opening and the image sensor, wherein the lens further includes a movable lens group;
   an actuator to selectively move the movable lens group; and
   a liquid crystal shutter positioned between the opening of the housing and the opening of the outer housing, to selectively either allow light to pass therethrough or block light from passing therethrough; and wherein
   the liquid crystal shutter has a top surface in contact with the outer housing and a bottom surface in contact with the housing.

7. A camera module as defined in claim 6, wherein the lens further includes a fixed lens group.

8. A camera module as defined in claim 6, wherein the actuator located inside of the outer housing.

9. A camera module as defined in claim 6, further including a circuit substrate to which the housing is attached, the substrate having a top side to which the image sensor is attached and a bottom side on which a plurality of electrical contact pads are provided for electrical connection of the image sensor and the shutter to circuitry external to the camera module.

10. A camera module as defined in claim 6, wherein the outer housing includes a shield for reducing electromagnetic interference in the interior of the cavity from electromagnetic signals outside of the housing.

* * * * *